(12) United States Patent
Singh et al.

(10) Patent No.: US 7,830,644 B2
(45) Date of Patent: Nov. 9, 2010

(54) HIGH DIELECTRIC CAPACITOR MATERIALS AND METHOD OF THEIR PRODUCTION

(75) Inventors: Narsingh B. Singh, Ellicott City, MD (US); John J. Talvacchio, Ellicott City, MD (US); Marc Sherwin, Catonsville, MD (US); Andre Berghmans, Owing Mills, MD (US); David J. Knuteson, Columbia, MD (US); David Kahler, Arbutus, MD (US); Brian Wagner, Baltimore, MD (US); John D. Adam, Millersville, MD (US)

(73) Assignee: Northop Grumman Systems Corporation, Los Angeles, CA (US)

( * ) Notice: Subject to any disclaimer, the term of this patent is extended or adjusted under 35 U.S.C. 154(b) by 251 days.

(21) Appl. No.: 11/713,783

(22) Filed: Mar. 5, 2007

(65) Prior Publication Data
US 2008/0218940 A1 Sep. 11, 2008

(51) Int. Cl.
*H01G 4/06* (2006.01)
*H01G 4/005* (2006.01)
(52) U.S. Cl. .............................. 361/311; 361/303
(58) Field of Classification Search .............. 361/303, 361/305, 311, 321.2
See application file for complete search history.

(56) References Cited
U.S. PATENT DOCUMENTS

| | | | | |
|---|---|---|---|---|
| 5,484,753 A | * | 1/1996 | Kagata et al. | 501/136 |
| 6,060,735 A | * | 5/2000 | Izuha et al. | 257/295 |
| 6,727,199 B2 | | 4/2004 | Subramanian | |
| 2004/0004236 A1 | * | 1/2004 | Fox et al. | 257/295 |
| 2006/0120020 A1 | * | 6/2006 | Dowgiallo, Jr. | 361/313 |
| 2007/0121274 A1 | * | 5/2007 | Talvacchio et al. | 361/311 |

OTHER PUBLICATIONS

Chung et al., "Site-selectivity of 3d metal cation dopants and dielectric response in calcium copper titanate", Mar. 2, 2006, Applied Physics Letters 88, 091917 (2006).*

Guzman et al, "Synthesis and characterization of Ca1-xSrxCu3Ti4O12 thin films for dielectric applications" , 2004, Mat. Res. Soc. Symp. Proc. vol. 785, Materials Research Society.*

Bochu et al., "Synthèse et caractérisation d'une série de titanates pérowskites isotypes de $[CaCu_3](Mn_4)O_{12}$," Journal of Solid State Chemistry, 29:291-298, 1979.

Li et al., "Correlation Between Dielectric Properties and Sintering Temperatures of Polycrystalline $CaCu_3Ti_4O_{12}$," IEEE Transactions on Dielectrics and Electrical Insulation, 11(3):534-541, 2004.

(Continued)

*Primary Examiner*—Eric Thomas
(74) *Attorney, Agent, or Firm*—Rothwell, Figg, Ernst & Manbeck, P.C.

(57) ABSTRACT

Methods of producing polycrystalline and single crystal dielectrics are disclosed, including dielectrics comprising $CaCu_3Ti_4O_{12}$ or $La_3Ga_5SiO_4$. Superior single crystals are manufactured with improved crystallinity by atomic lattice constant adjustments to the dielectric and to the substrate on which it is grown. Dielectric materials made according to the disclosed methods are useful for manufacture of energy storage devices, e.g. capacitors.

14 Claims, 6 Drawing Sheets

OTHER PUBLICATIONS

Fang et al., "Effects of Postanneal Conditions on the Dielectric Properties of $CaCu_3Ti_4O_{12}$, Thin Films Prepared on $Pt/Ti/SiO_2/Si$ Substrates," Journal of Applied Physics, 95(11):6483-6485, 2004.

Homes et al., "Optical Response of High-Dielectric-Constant Perovskite-Related Oxide," Science, 293:673-676, 2001.

Si et al., "Epitaxial Thin Films of the Giant-Dielectric-Constant Material $CaCu_3Ti_4O_{12}$ Grown by Pulsed-Laser Deposition," Applied Physics Letters, 81(11):2056-2058, 2002.

Talvacchio et al., "Lattice-Matched, Large-Grain HTS Films for Reproducible Josephson Junctions," IEEE Transactions on Applied Superconductivity, 13(2):829-832, 2003.

Subramanian et al., "High Dielectric Constant in $ACu_3Ti_4O_{12}$ and $ACu_3Ti_3FeO_{12}$ Phases," Journal of Solid State Chemistry, 151:323-325, 2000.

Anonymous, "Capacitor ESR Ratings—ESR Equivalent Series Resistance," Transtronics, http://xtronics.com (6 pgs.), 2006.

* cited by examiner

HIGH DIELECTRIC CAPACITOR MATERIALS AND METHOD OF THEIR PRODUCTION

BACKGROUND OF THE INVENTION

1. Technical Field

The invention relates to the field of materials science and in particular to improvements in materials which are useful in charge storage devices such as capacitors.

2. Description of the Background Art

Capacitors are used in a number of electronic devices. As these capacitors improve and devices requiring increased energy storage are designed, it is desirable to decrease the size and weight of capacitors, both for ease of portability of the device itself and, in larger applications, to reduce the size and weight of the device while maintaining or improving the power storage needs for complex modern devices. The size and weight of some conventional charge storage devices can limit the mobility of the system in which they are used.

For example, high performance capacitors are used or have the potential for use in applications requiring solid state power components, power electronics and sensors for civilian and military applications, such as space craft; ocean-going ships, particularly all-electric ships; directed energy weapons; commercial and military aircraft and their components; industrial applications requiring tremendous torque such as freight trains and very large dump truck for use in mining; or any application where it is desirable or necessary to handle large voltage and/or reduce weight. Heavier devices are particularly disadvantageous in applications such as spacecraft, unmanned aerial or ground vehicles for military and civilian applications, aeronautics, shipping, heavy industrial and military vehicles, or any application which relies on advanced power electronics to handle large voltage, from very large ships to smaller personnel transports such as Humvees. Therefore, capacitors with superior ability to handle and store current with less weight and bulk would be highly desirable for manufacture of smaller and more portable electronic devices and could be used in multi-layer capacitors such as those which are commonly used as surface mount devices in microwave printed wiring boards or in hybrid integrated circuits DC filtering, or in single-layer capacitors for applications where the highest frequency response is desirable.

SUMMARY OF THE INVENTION

Accordingly, embodiments of this invention provide a method of making a $CaCu_3Ti_4O_{12}$ or $La_3Ga_5SiO_4$ crystalline composition which comprises (a) mixing together, in stoichiometric amounts, powdered materials comprising the Ca, Cu and Ti; or La, Ga and Si components of said composition; (b) subjecting said mixed powders to heat to substantially react the powdered components to form said polycrystalline composition; and (c) press said reacted mixture to form a pellet at a high temperature, preferably below 120° C. Optionally, the method may further comprise interrupting the subjecting the mixed powders to heat, re-mixing the powdered materials, pressing the re-mixed materials and resuming subjecting the mixed powders to heat. A preferred polycrystalline composition is $CaCu_3Ti_4O_{12}$. The powdered materials are selected from the group consisting of calcium oxide, calcium carbonate, calcium oxalate, calcium formate, copper oxide, copper carbonate, copper oxalate, titanium dioxide, titanyl carbonate, titanyl oxalate and a combination thereof. The heat preferably is about 1100° C. to about 1200° C., and most preferably is applied for 120 hours. Further embodiments of the invention include polycrystalline compositions made according to the methods described above.

Additional embodiments of the invention include a method of adjusting the lattice constant mismatch of a film crystal $CaCu_3Ti_4O_{12}$ dielectric and a deposition substrate, which comprises substituting at least a portion of an ion of the crystal structure of the $CaCu_3Ti_4O_{12}$ dielectric with an ion having a different ionic radius during liquid phase epitaxial growth of the crystal, wherein the lattice constant of said crystal is changed. A further additional embodiment of the invention includes a method of adjusting the lattice constant mismatch of a film crystal $CaCu_3Ti_4O_{12}$ dielectric and a deposition substrate, which comprises substituting at least a portion of an ion of the deposition substrate with an ion having a different ionic radius, wherein the deposition substrate is a conductive oxide electrode and wherein the lattice constant of said conductive oxide electrode is changed. Yet another embodiment of the invention includes a method of adjusting the lattice constant mismatch of a film crystal $CaCu_3Ti_4O_{12}$ dielectric and a deposition substrate, which comprises depositing a seed layer of $CaCu_3Ti_4O_{12}$ onto the deposition substrate.

In the methods above, calcium may be substituted with an ion selected from the group consisting of a strontium ion, a bismuth ion, a sodium ion, a lanthanum ion, an ion of a lanthanide element, and a combination of any thereof, and titanium may be substituted with an ion selected from the group consisting of an iron ion, a ruthenium ion, a chromium ion, a germanium ion, a manganese ion and a combination of any thereof.

A further embodiment of the invention includes a dielectric which comprises $Ca_{0.8}Sr_{0.2}Cu_3Ti_4O_{12}$.

A further embodiment of the invention includes a capacitor which comprises dielectrics as discussed above.

Particular embodiments of the invention provide methods in which a conductive oxide electrode comprises $(LaSr)_2CuO_4$ sometimes referred to as LSCuO, or $(LaSr)_2CoO_4$, sometimes referred to as LSCoO.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use embodiments of the invention. In the drawings, like reference numbers indicate identical or functionally similar elements.

DETAILED DESCRIPTION OF THE PREFERRED EMBODIMENTS

Both the capacitance and stored energy density of a material used in a capacitor are directly proportional to the dielectric constant of the material. High-$\in$ dielectric materials therefore would be desirable to manufacture capacitors which can handle huge amounts of voltage. In thin-film form, CCTO has a relative dielectric constant, $\in$, as high as 1500 (i.e. 1500 times the permitivity of free space). In contrast to most CCTO films, CCTO single crystals are reported to have a relative dielectric constant of 80,000. Polycrystalline ceramic CCTO usually has an $\in$ value in the range of 5,000 to 25,000. CCTO materials therefore are useful as dielectrics in capacitors which need to handle the higher levels of voltage in some modern applications. Embodiments of this invention provide improved high-$\in$ dielectric materials which can be used in manufacturing capacitors for high voltage applications and overcome some of the problems in the prior materials. An extremely thin layer of a large dielectric material capacitor can be used in microwave circuits well beyond W-band (<110 Ghz), another advantage of materials according to the invention.

Methods of producing complex oxide materials such as CaCu$_3$Ti$_4$O$_{12}$ (CCTO), and many other complex oxides, which are suitable for capacitor dielectrics, also form part of the embodiments of this invention. Bulk single crystals can be formed using melt growth methods, including a combination of the Czochralski (a growth method involving crystal growth by pulling and rotating seed from a melt) and the flux methods (a growth method carried out from a solution containing flux which dissolves the material to be grown (nutrient), and a combination of the Bridgman (a sealed container method) and flux methods. The combination of the flux and Bridgman involves a sealed container which contains flux and nutrient. The container is passed through a temperature gradient to cause the crystal to grow. The Bridgman method also can be adapted and designed as traveling solvent method. In a traveling solvent method, the nutrient material is dissolved in a solvent and a small melt zone is created. The solid-liquid interface is controlled by a method similar to zone-melting. Whether a traveling solvent method is used or not, a solvent such as PbO, PbO and Bi$_2$O$_3$, CuO, Bi$_2$O$_3$KCl, PbC$_{12}$, or PbF$_2$ is suitable for the method. Solvent methods for the growth of CCTO can be performed below 1400° C. so that a platinum crucible can be used. Some details of methods which can be used in the invention can be found in Singh et al., J. Crystal Growth 234:660, 2002, the disclosures of which are hereby incorporated by reference.

Multicrystalline material can be produced by solid and liquid phase sintering methods, including annealing, solid-state reaction, solid-state grain growth, and solid-liquid grain growth methods. Grain growth generally is carried out by a diffusion process during formation of the crystals where the process of diffusion is enhanced by increasing the temperature or adding impurity as flux. When the components of CCTO are mixed, usually the thaw (solidus) temperature of the mixture is lower than that for the individual components. If this occurs, drops of liquids trapped in the solid will enhance the diffusion and therefore the reaction process.

CCTO and other oxide materials can be prepared using a solid-solid or solid-liquid sintering method. In this procedure the (metallic) components of the material are mixed together as powders in stoichiometric amounts (ratios), subjected to heat to cause the materials to react to form the final compound, and pressed into the shape and size which is required by the application for the dielectric. The mixed powdered material is placed in a furnace, usually below the melting point of lowest constituent. Oxygen optionally is flowed through the furnace during heating to assist in making an oxygen-rich compound. Heat is applied for many hours, depending on the size of the sample. For example, heat would be applied for about 120 hours total or any length of time sufficient to substantially complete the reaction. In some embodiments, after the material is subjected to heat for more than about 50 hours, the partially annealed material is re-mixed and then pressed. Heating then is resumed for about 100 hours. This optional re-mixing process helps in achieving a more homogeneous and completely reacted material with the correct stoichiometry.

Higher reaction temperatures (above the melting point of lowest constituent) may be used in these methods, however there is a danger that at higher temperatures CuO in the mixture could react with the crucible material and in particular to impurities in the crucible, resulting in a loss of desirable properties for the CCTO. Therefore, under normal circumstances, temperatures about 1100° C. are preferred and temperatures much over about 1200° C. generally are not preferred when reaction with the crucible may be a concern, but can reach about 1300° C. or 1400° C. Preferred temperatures are from about 1100° C. to about 1200° C. During the heating process, the reaction advantageously takes place by solid-state diffusion. CCTO materials made in this manner, using CaCO$_3$, CuO and TiO$_2$ with annealing at 1100° C. for about 120 hours, compared favorably with prior compounds, demonstrating a very high dielectric constant (greater than 24,000 at 1 kHz) and a loss tangent (tan $\Delta$) of 0.03, a lowest reported value. Example 2 shows a specific example for performing this method. This process is scalable and can be used to produce any size or amount of material.

Multi-component oxide compounds such as CCTO generally are prepared from the oxides of the constituents. By using carbonates, oxalates, and/or formates of the constituents instead, the fusion temperature can be decreased. The material made using this method are oxide rich. Therefore, in the case of CCTO, the starting components can be calcium carbonate, calcium oxalate, and/or calcium formate in place of calcium oxide to supply calcium; copper carbonate and/or copper oxalate in place of copper oxide to supply copper; and titanyl carbonate and/or titanyl oxalate in place of titanium oxide to supply titanium. In each case, the components are supplied in stoichiometric amounts, mixed, and reacted as described above or in Example 2.

Thick film crystals suitable for use as dielectrics, for example in a capacitor, also can be produced using liquid phase epitaxial growth methods. These methods also form part of the embodiments of this invention. For example, a thick film of the oxide material CaCu$_3$Ti$_4$O$_{12}$ (CCTO) can be grown by liquid phase epitaxy (LPE). This method also can be used grow films of other oxide materials, including Langasite (La$_3$Ga$_5$SiO$_{14}$) and Bi$_2$Sr$_2$CaCu$_2$O$_8$ (BSCCO). Since LPE growth can be performed at reduced temperatures and closer to chemical equilibrium than the above sintering methods, films with near perfect crystallinity and purity can be achieved using these methods. LPE growth involves PbO or PbO—$Bi_2O_3$ materials or the like as flux. After reaction, the material is dissolved and then a seed is used to grow film while lowering the temperature. However, in order to grow very high-quality films using the LPE growth technique, the substrate on which the film is grown and the experimental conditions preferably is chosen carefully to match as closely as possible the atomic lattice constant of the CCTO dielectric film material.

The substrate for deposition of the CCTO film advantageously is pre-coated with a conductive oxide film that serves as one of the two electrodes of a parallel-plate capacitor, as well as a template for nucleation and growth of the CCTO film crystal. See FIG. 1A, for example. In these embodiments, the surface of the conductive oxide layer that will act as the nucleation surface for LPE growth of CCTO is matched at the interface with the CCTO to be deposited. A second capacitor electrode optionally may be deposited on top of the CCTO and may be of any crystal structure. As used in this specification, the term "deposition substrate" is intended to denote any surface on which an oxide crystal is grown, including materials termed here as substrates, nucleation layers, conductive oxide layers, buffer layers or any layer or material on which a crystal film is grown. It is this layer which is matched to the lattice constant of the film crystal which is grown upon it, in preferred embodiments.

Figure 1A:
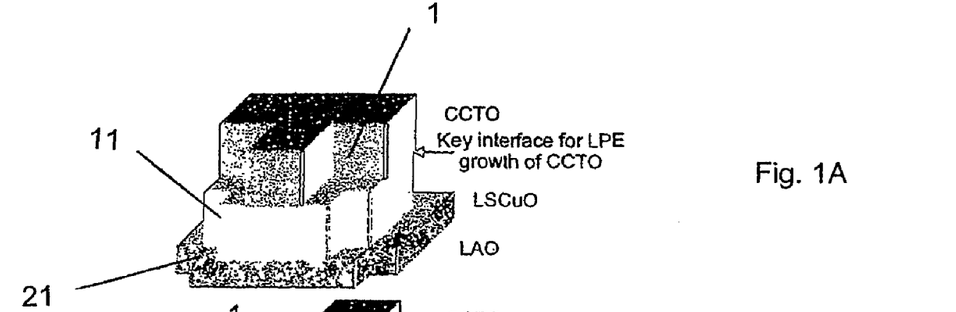
FIGS. 1A and 1B are cartoons which illustrate two exemplary combinations of materials for conductive electrode layers (11), buffer layers (31) and substrates (21 and 22) for epitaxial growth of CCTO (1) on an oxide electrode. An important interface with respect to the inventive materials and methods of embodiments of this invention is between the conductive oxide (11; LSCuO in these examples) and the CCTO film (1) grown by LPE.
Figure 1B:
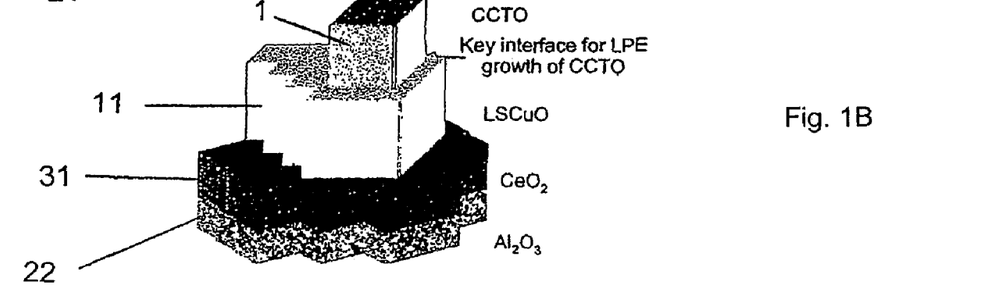

Table I, below, shows exemplary materials which are compatible with each other in various epitaxial combinations. FIG. 1 illustrates two of the possible epitaxial combinations from Table I and shows the interface between layers for which the mismatch is reduced using embodiments of the invention. The CCTO mismatch listed in the table is with respect to $CaCu_3Ti_4O_{12}$. Referring to FIG. 1, FIG. 1A depicts an exemplary configuration of a CCTO crystal film layer (1) on a conductive electrode layer of LSCuO (11), which sits on a substrate layer of $LaAlO_3$ (LAO) (21). FIG. 1B depicts a second exemplary configuration of a CCTO crystal film layer (1) on a conductive electrode layer of LSCuO (11), which in turn is on a substrate layer of $Al_2O_3$ (22). Positioned between the substrate layer (22) and the conductive electrode (11) is a buffer layer (31) comprising $CeO_2$.

TABLE I

Exemplary Compatible Materials for Substrates, Buffer Layers and Conductive Oxide Films for high ε CCTO dielectric templates.

| Material Name | Formula | Symmetry | Structure | Avg. $a_o, b_o$[1] | CCTO Mismatch |
|---|---|---|---|---|---|
| High ε Dielectrics | | | | | |
| CCTO[2] | $CaCu_3Ti_4O_{12}$ | cubic | perovskite | 3.69 | 0.0% |
| Sr-CCTO | $(Ca,Sr)Cu_3Ti_4O_{12}$ | cubic | perovskite | ~3.75[3] | 1.6% |
| Conductive Electrodes | | | | | |
| LSCuO | $(La,Sr)_2CuO_4$ | tetragonal | perovskite-related $K_2NiF_4$ structure | 3.78 | 2.4% |
| LSCoO | $La_{0.5}Sr_{0.5}CoO_3$ | ~cubic | perovskite | 3.84 | 4.1% |
| LNO | $LaNiO_3$ | ~cubic | perovskite | 3.86 | 4.6% |
| SRO | $SrRuO_3$ | cubic | perovskite | 3.91 | 6.0% |
| YBCO | $YBa_2Cu_3O_7$ | orthorhombic | perovskite | 3.85 | 4.4% |
| Substrates and Buffer Layers | | | | | |
| Silicon | Si | cubic | diamond | 3.84 | 4.1% |
| Sapphire | $Al_2O_3$ (R-plane) | hexagonal | Other | 3.49 | −5.5% |
| LAO | $LaAlO_3$ | ~cubic | perovskite | 3.79 | 2.8% |
| NGO | $NdGaO_3$ | ~cubic | perovskite | 3.86 | 4.7% |
| LSAT | La—Sr—Al—Ta—O | cubic | perovskite | 3.87 | 5.0% |
| STO | $SrTiO_3$ | cubic | perovskite | 3.905 | 5.8% |
| $CeO_2$ | $CeO_2$ | cubic | Other | 3.83 | 3.7% |

[1]Includes experimentally verified 45° in-plane rotation where appropriate.
[2]Experimental measurements; other data in table are collected from the literature.
[3]Estimated.

According to one embodiment of the invention, CCTO films with high crystalline quality can be grown using liquid phase epitaxy (LPE) to achieve a CCTO film with an improved match between the lattice constant of the deposition substrate surface and the CCTO film. For optimal performance of the material, it is preferred to reduce the lattice constant mismatch at the interface between the CCTO and the substrate below values of about 2.4%, 4.1%, 4.6%, 6.0% and 4.4% for $(La,Sr)_2CuO_4$ (LSCuO), $La_{0.5}Sr_{0.5}CoO_3$ (LSCoO), $LaNiO_3$ (LNO), $SrRuO_3$ (SRO) and $YBa_2Cu_3O_7$ (YBCO) substrates, respectively, so that the crystallinity of the material is improved. Ideally, the preferred mismatch is less than 1%. Therefore, "matching" the lattice constant of an oxide film crystal to a deposition substrate or adjusting the lattice constant mismatch between two materials, which phrases are used substantially interchangeably herein, is not intended to indicate that the lattice constants must be identical, however more precise matching is preferred.

One of the most important criteria in producing the highest quality film crystals is matching of the atomic lattice of the substrate to those of the oxide being grown on the substrate as closely as possible. Therefore the substrate chosen preferably has appropriate symmetry and similar lattice parameters to the material to be grown. Furthermore, an ideal substrate also should be chemically and physically stable and easy to obtain. When a flux method is used, the flux used preferably has no chemical interactions with the oxide compound, but is capable of dissolving the oxide compound. Finally, the growth conditions for the crystal should be stable and easily controlled to produce the highest possible quality material.

Additional embodiments of the invention include three general methods for adjusting the lattice constant mismatch between CCTO and the substrate or other material on which it is layered. These methods may be used individually or in any combination to reduce the lattice constant mismatch: (1) introduction of different ions (an ion having a different ionic radius than the ion for which it is substituted) into the crystal structure of CCTO by using a partial chemical substitution can be used to increase or decrease its lattice constant; (2) introduction of different ions (an ion having a different ionic radius than the ion for which it is substituted) into the crystal structure of the conductive oxide film by using a partial chemical substitution can be used to increase or decrease the lattice constant of the conductive oxide film; and (3) deposition of a thin seed layer of CCTO by vapor deposition. If there is a large difference in lattice parameter, stress and other problems such as cracking may occur.

An advantageous method of increasing the lattice constant of CCTO material is to replace some of the calcium in the CCTO with strontium. For this method, up to about 50% of the calcium may be replaced with strontium. Preferably, about 20-22% of the calcium is replaced by strontium.

In addition to changes in lattice constant, some changes in dielectric constant can occur with substitution of calcium with strontium (strontium doping). The dielectric constant may increase or in some instances decrease. Preferred strontium-doped materials have an unchanged or increased dielectric constant, however small or moderate decreases in dielectric constant can be tolerated to achieve the improved crystallinity which results from better lattice match between the layers. For example, partial chemical substitution of 20% of the calcium in CCTO by strontium increases the dielectric constant of CCTO polycrystalline ceramic samples.

The lattice constant of Sr-doped CCTO listed in Table 1 is an estimate based on ionic radii. Based on this estimate, about 20% Sr reduces the mismatch between CCTO and LSCuO from 2.4% to 0.8%. Doping with more than 20% strontium or concomitant use of other or additional large-radius ions in chemical substitutions can eliminate the entire mismatch. For example, doping with about 20% strontium can reduce the mismatch between CCTO and LSCuO to near 0%. Large-radius ions which can be used instead of strontium or in addition to strontium for replacement of calcium include bismuth, sodium, lanthanum or any lanthanide element, or combinations thereof. Preferably, +1 or +3 ions are used in a ratio of about 1:1 with strontium to replace about 20% or more of the calcium in CCTO. These ions can be used in any amount from 0% to 100% to achieve improvements in lattice constant matching.

Titanium ion in CCTO may be substituted with iron, ruthenium, chromium, germanium, manganese or any combination thereof to achieve an increase in lattice constant in the same manner. Without wishing to be bound by theory, substitutions on the Ca site would appear more likely to leave the desirable dielectric properties of CCTO largely intact since the motion of the small titanium ion in its octahedral oxygen cage is thought to be the structural origin for the large dielectric constant. Therefore, in general, substitutions for calcium are preferred over substitutions for titanium to produce materials with a retained high dielectric constant.

In addition to raising the lattice constant of the CCTO, the mismatch of lattice constants also may be improved by changing the lattice of the conductive-oxide electrode material. This approach inherently may have less risk than the first approach above in terms of undesirably changing other properties of the material because it is necessary only to preserve the electrical conductivity of the material while adjusting the lattice constant. While adjusting the lattice constant of CCTO, it is desirable also to preserve or enhance the unusually high dielectric constant of this particular material and also simultaneously to preserve its dielectric loss and electrical resistivity (i.e., leakage current) properties.

Partial chemical substitutions in the conductive oxides can be used to engineer a desired value for the lattice constant, or a change in the lattice constant to a value closer to that of the CCTO material used. For example, when adjusting the lattice constant of conductive oxide materials such as NdBCO and YBCO films, measured lattice constant values of the films, which vary slightly from their bulk values, can be used as a guide to select a Nd:Y ratio that gives a better match to any CCTO lattice constant. See Example 3. Thus, altering the Nd:Y ratio of an NdBCO or YBCO film produces changes in the average lattice constant.

A third approach to match the lattice constant of an overlayer of material such as an LPE-grown CCTO overlayer with the surface onto which it is layered is to grow a seed layer of CCTO thin film by either pulsed laser deposition (PLD) or sputtering on top of the conductive oxide film prior to overlaying the high dielectric constant material. The seed layer may have a different lattice constant than bulk CCTO due to stress in the film. A 5 nm-thick vapor-deposited layer is likely to be strained when part of a thicker film. Therefore, the deposition of a CCTO seed layer followed by homo-epitaxial growth of a CCTO crystal by LPE over this layer can improve lattice-constant mismatch. This method may be used as the only approach or in combination with the other two claims in this invention.

In physical vapor deposition growth, lattice matching to better than a few percent does not appear to have much benefit for this type of CCTO growth, but the CCTO properties are severely degraded compared to crystals. Therefore, an overlaid LPE-grown CCTO crystal capacitor may have a dielectric constant 2 orders of magnitude greater than the vapor-deposited CCTO capacitor seed layer. When this is the case, the vapor-deposited seed layer most preferably is at least 2 orders of magnitude thinner than the high dielectric constant CCTO material. For typical LPE-grown CCTO layer thicknesses of about 0.5 µm, this would limit the seed-layer thickness to about 5 nm. Thus, the preferred maximum thickness for the seed layer is determined by the fact that effectively two capacitors are placed in series when this method is used. As general guidelines, the thickness of the seed layer can vary from about 5 nm and the overlaid CCTO layer can vary from about 0.5 µm to about 2 µm.

EXAMPLES

Example 1

Production of CCTO Dielectrics

The combination shown in FIG. 1A was constructed. Physical vapor deposition techniques (pulsed laser deposition (PLD)) or sputtering were used to deposit buffer layers, conductive oxides and CCTO itself. In addition, an electrode comprising layers 1, 11 and 31 was manufactured using the sputtering and laser deposition techniques. The verification was performed using X-ray diffraction.

Example 2

Figure 2:
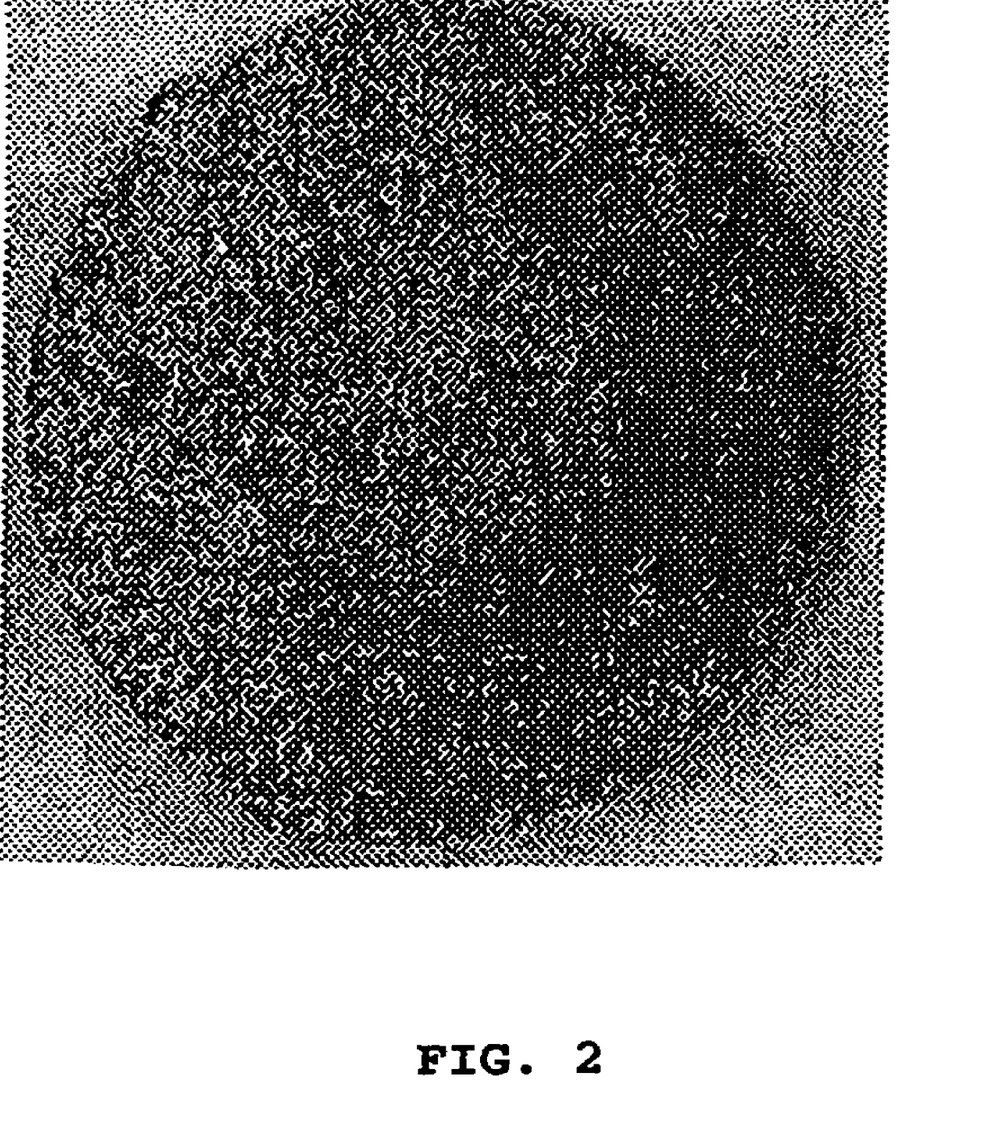
FIG. 2 is a photograph of a CCTO pellet according to an embodiment of the invention.

Solid-Solid, Solid-Liquid Sintering Method to Produce CCTO Material with Advantageous Dielectric Properties A mixture of powders containing 0.220 g $CaCO_3$, 0.520 g CuO and 0.700 g $TiO_2$ was placed in a platinum crucible and subjected to heat (annealed) in the form of pellet for approximately 120 hours in a furnace at 1100° C. An annealed pellet about 1 cm in diameter and about 2 mm thick was formed. See FIG. 2.

Figure 3:
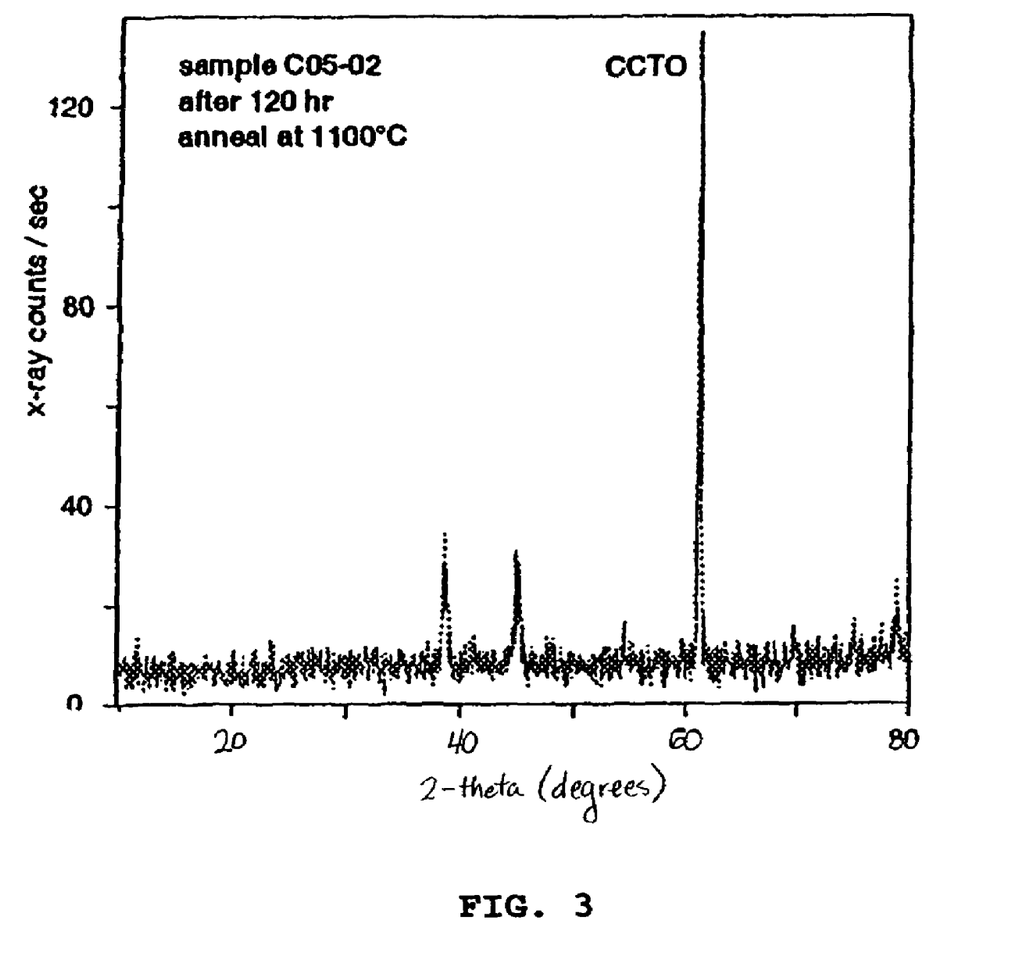
FIG. 3 presents powder X-ray diffraction data for material produced according to Example 1.

The reacted mixture was examined by powder X-ray diffraction. Characteristic peaks after annealing of 120 hours as described above are shown in FIG. 3. The strongest peak of the sample was a good match to CCTO.

Figure 4:
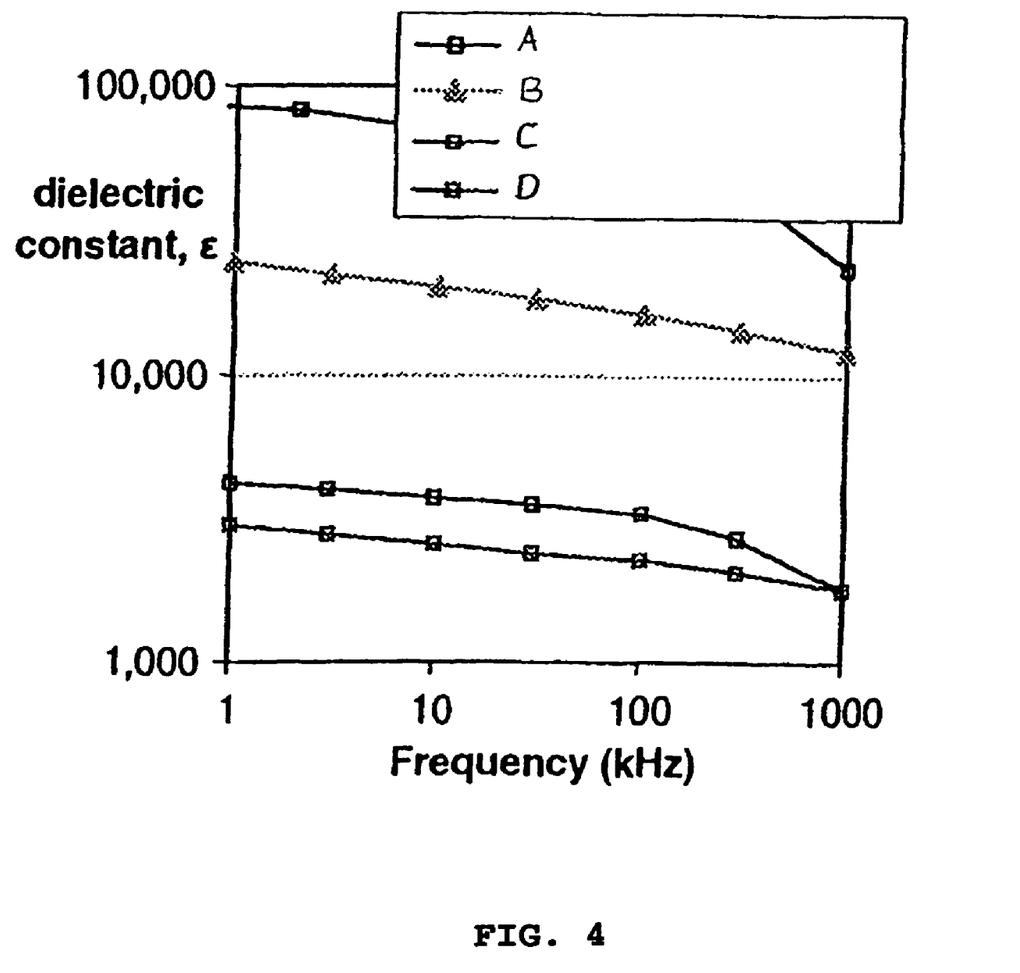
FIG. 4 is a graph providing dielectric constant data at the indicated frequencies for an inventive dielectric ceramic and three other materials. A=CCTO single crystal; B=inventive dielectric; C=CCTO ceramic; D=CCTO polycrystalline film.
Figure 5:
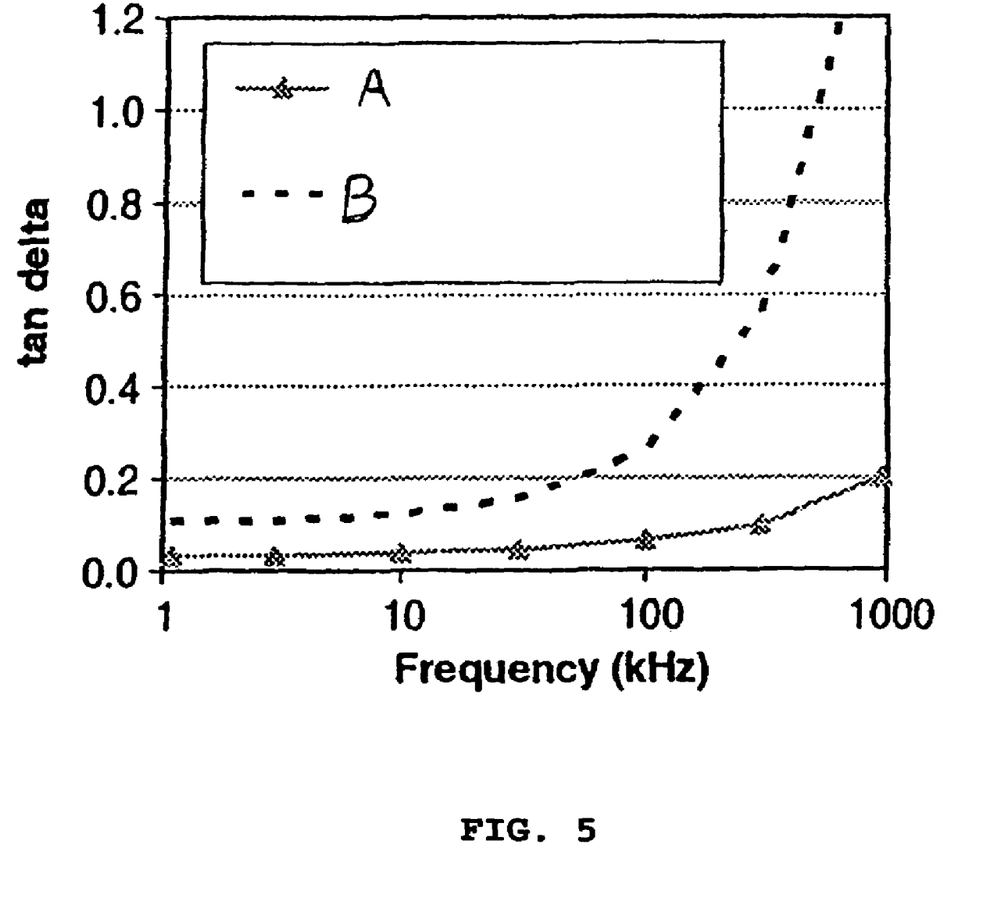
FIG. 5 is a graph providing loss tangent ("tan delta") data for a dielectric ceramic according to the invention compared to published data for CCTO films.

The dielectric constant and loss tangent of this pellet were extracted from measurements of complex impedance made using a complex impedence (LCR) meter. See FIGS. 4 and 5. The dielectric constant (FIG. 4, line B), which was higher than 24,000, compared well with a single crystal prepared by solid-state sintering (A; Homes et al., Science 293:673-676, 2001) and was superior to two other prior art materials (C; Subramanian et al., J. Solid State Chem. 151:323-325, 2000) and (D; Fang et al., J. Appl. Phys. 95(11):6483-6485, 2004). See FIG. 4. The loss tangent, however, was 0.03 for frequencies up to 30 kHz. This is lower than found in the literature for CCTO films. See FIG. 5, which compares a composition made according to the invention (A) with a known composition (B; Si et al., Appl. Phys. Lett. 81:2056, 2002). This prior material was a small sample, prepared by a traveling zone method, a very lengthy process. The inventive process can produce a very large sample without complex fabrication methods, and is suitable for production of large quantities.

Example 3

Lattice Constant Adjustment of an Oxide Film Material

Figure 6:
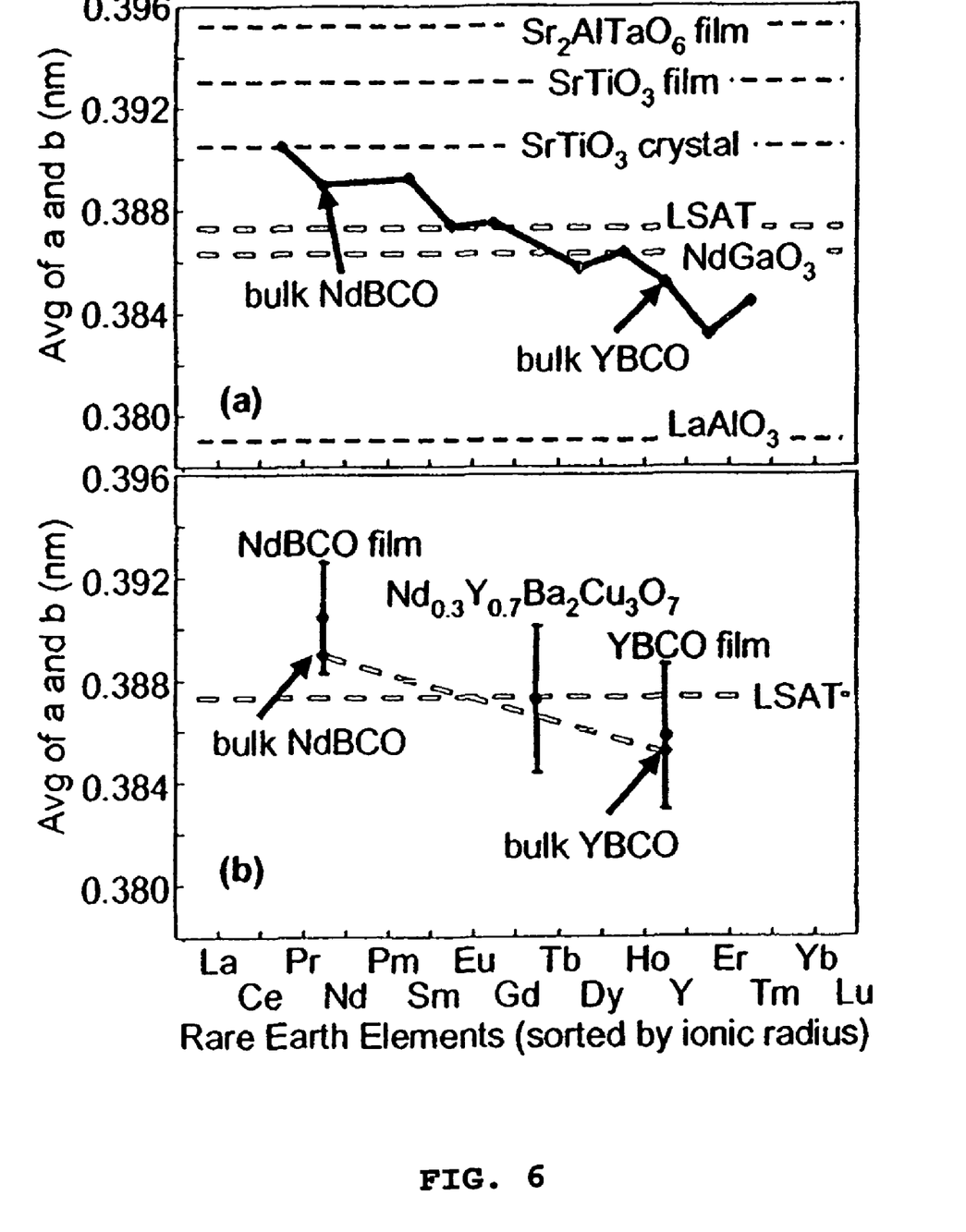
FIG. 6A presents a-b plane lattice constant (nm) data for bulk RE-BCO and for exemplary substrates and buffer layers as indicated by horizontal dashed lines. LSAT=La—Sr—Al—Ta—O; NdBCO=NdBa$_2$Cu$_3$O; YBCO=YBa$_2$Cu$_3$O; RE-BCO=rare earth Ba$_2$Cu$_3$O.
FIG. 6B provides a-b plane lattice constant (nm) data for NdBCO and YBCO films and an Nd$_{0.3}$Y$_{0.7}$Ba$_2$Cu$_3$O$_7$ film.

An X-ray diffraction method was used to determine lattice parameters. In FIG. 6A, the average a-b plane lattice constants for bulk rare earth-barium copper oxide (RE-BCO) are compared with exemplary substrates and buffer layers as indicated by horizontal dashed lines. The solid line represents data connecting other rare earth compositions as indicated on the X-axis.

FIG. 6B shows the a and b lattice constants of NdBCO and YBCO films and an inventive $Nd_{0.3}Y_{0.7}Ba_2Cu_3O_7$ film matched to within 0.1% of the lattice constant of a La—Sr—Al—Ta—O (LSAT) substrate with a perovskite structure using substitution of Nd in a $YBa_2Cu_3O_7$ material to produce an Nd—Y composition made up of 30% Nd and 70% Y in place of 100% Nd or 100% Y. The error bars show the difference between the a-axis and b-axis lattice constants. The downward-sloping dotted line shows the average a-b plane lattice constants of bulk NdBCO and YBCO films for comparison. At the growth temperature, they are tetragonal (not orthorhombic), i.e. a=b at 800° C. so only their average is meaningful. Nevertheless, partial chemical substitutions in conductive oxides can be used to engineer a desired lattice constant value using these values as a guide.

REFERENCES

All references cited herein are hereby incorporated by reference in their entirety.
1. Bochu et al., "Synthèse et caractérisation d'une série de titanates pérowskites isotypes de $[CaCu_3]$ $(Mn_4)O_{12}$," J. Solid State Chem. 29:291-298, 1979.
2. Deschanvres et al., "Replacement de metal bivalent par le cuivre dans les titanates de type Perowskite," Bull Soc. Chim. Fr., 4077-4078, 1967.
3. Fang et al., "Effects of postanneal conditions on the dielectric properties of $CaCu_3Ti_4O_{12}$ thin films prepared on Pt/Ti/SiO2/Si substrates," J. Appl. Phys. 95(11):6483-6485, 2004.
4. Homes et al., "Optical response of high-dielectric-constant perovskite-related oxide," Science 293:673-676, 2001.
5. Li et al., "Correlation between dielectric properties and sintering temperatures of polycrystalline $CaCu_3Ti_4O_{12}$," IEEE Trans. Dielectr. Electr. Insul. 11:534-541, 2004.
6. Si et al., "Epitaxial thin films of the giant-dielectric-constant material $CaCu_3Ti_4O_{12}$ grown by pulsed-laser deposition," Appl. Phys. Lett. 81:2056-2058, 2002.
7. Subramanian et al., "High dielectric constant in $ACu_3Ti_4O_{12}$ and $ACu_3Ti_3FeO_{12}$ phases," J. Solid State Chem 151:323-325, 2000.
8. Subramanian, presentation at Indo-U.S. Workshop, Pune, December 2004.
9. Subramanian, U.S. Pat. No. 6,727,199 B2.
10. Talvacchio et al., "Lattice-matched, large-grain HTS films for reproducible Josephson Junctions," IEEE Trans. 13(2):829-832, 2003.

The invention claimed is:
1. A lattice-matched capacitor which comprises at least a first and second layer,
 a) the first layer comprising a conductive oxide electrode material having first a lattice constant which comprises $(LaSr)_2CuO_4$ (LSCuO),$(LaSr)_2CoO_4$(LSCoO), or both; and
 b) the second layer comprising a dielectric material having a second lattice constant which comprises (Ca,Sr)$Cu_3Ti_4O_{12}$ (CSCTO), $CaCu_3Ti_4O_{12}$ (CCTO) or both; wherein said first lattice constant, said second lattice constant, or both are engineered by ion substitution to achieve a smaller lattice constant mismatch between said first layer and said second layer and wherein at least part of the calcium ions of said dielectric material are substituted with ions selected from the group consisting of strontium ions, bismuth ions, sodium ions, lanthanum ions, an ion of a lanthanide element, and a combination of any thereof.
2. A capacitor of claim 1 wherein said lattice constant mismatch is below about 4.1%.
3. A capacitor of claim 1 wherein said lattice constant mismatch is below about 2.4%.
4. A capacitor of claim 1 wherein said lattice constant mismatch is less than 1%.
5. A capacitor of claim 1 wherein at least part of the titanium ions of said dielectric material are substituted with ions selected from the group consisting of iron ions, ruthenium ions, chromium ions, germanium ions, manganese ions, and a combination of any thereof.
6. A capacitor of claim 1 wherein calcium ions of said dielectric material are substituted with strontium ions.

7. A capacitor of claim 1 wherein 20% to about 22% of the calcium ions of said dielectric material are substituted with strontium ions.

8. A capacitor of claim 1 wherein said dielectric material comprises $Ca_{0.8}Sr_{0.2}Cu_3Ti_4O_{12}$.

9. A capacitor of claim 1 wherein said dielectric material has been produced by liquid phase epitoxy.

10. A capacitor of claim 1 wherein said dielectric material has been produced by melt growth.

11. A capacitor of claim 1 herein said dielectric material has been produced by a flux method.

12. A capacitor of claim 1 herein said dielectric material has been produced by pulsed laser deposition.

13. A capacitor of claim 1, which further comprises a third substrate layer adjacent to said first layer, wherein said first lattice constant is engineered by ion substitution to achieve a smaller lattice constant mismatch between said first layer and said third layer.

14. A capacitor of claim 13 wherein said third layer is about 5 nm thick.

* * * * *